United States Patent
Li et al.

(10) Patent No.: US 9,601,285 B2
(45) Date of Patent: Mar. 21, 2017

(54) METHOD AND APPARATUS PERTAINING TO KEYCAP LIGHT GUIDES

(71) Applicant: BlackBerry Limited, Waterloo (CA)

(72) Inventors: Xiaofeng Li, Kitchener (CA); Chao Chen, Waterloo (CA); Li Huang, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 647 days.

(21) Appl. No.: 13/673,284

(22) Filed: Nov. 9, 2012

(65) Prior Publication Data

US 2014/0133127 A1 May 15, 2014

(51) Int. Cl.
*G01D 11/28* (2006.01)
*H01H 11/00* (2006.01)
*F21V 8/00* (2006.01)
*H01H 13/83* (2006.01)

(52) U.S. Cl.
CPC .......... *H01H 11/00* (2013.01); *G02B 6/0021* (2013.01); *G02B 6/0088* (2013.01); *H01H 13/83* (2013.01); *H01H 2219/044* (2013.01); *H01H 2219/062* (2013.01); *H01H 2227/002* (2013.01); *Y10T 29/49105* (2015.01)

(58) Field of Classification Search
CPC ............. G02B 6/0088; G02B 6/0021
USPC ........................................ 362/23.03
See application file for complete search history.

(56) References Cited

U.S. PATENT DOCUMENTS

| 2009/0067153 | A1* | 3/2009 | Takeda et al. ................ 362/85 |
| 2010/0258419 | A1* | 10/2010 | Chung et al. ............... 200/314 |
| 2011/0149605 | A1 | 6/2011 | Sato |
| 2011/0290629 | A1 | 12/2011 | Park |

OTHER PUBLICATIONS

Extended European Search Report from related European Patent Application No. 12191942.7 dated Apr. 18, 2013; 7 pages.

* cited by examiner

*Primary Examiner* — Evan Dzierzynski
(74) *Attorney, Agent, or Firm* — Jon Gibbons; Fleit Gibbons Gutman Bongini & Bianco P.L.

(57) ABSTRACT

An apparatus (such as a keyboard) has a plurality of keycaps and a corresponding light guide film disposed on the underside of those keycaps. The light guide film has a periphery, and at least portions of that periphery are thicker than in an interior portion of the light guide film. So configured, more light can be made available for backlighting purposes in the thicker portions than at the thinner portions. These teachings include determining the various (different) thicknesses to employ for the light guide film based upon desired backlighting of one or more of the plurality of keycaps.

13 Claims, 3 Drawing Sheets

METHOD AND APPARATUS PERTAINING TO KEYCAP LIGHT GUIDES

FIELD OF TECHNOLOGY

The present disclosure relates generally to keyboards and more particularly to the use of backlighting for keycaps.

BACKGROUND

Electronic devices of various sizes often employ keyboards to facilitate the entry of user input. Examples of such keyboards include keyboards configured to facilitate the entry of alphanumeric characters (such as the ubiquitous QWERTY-styled keyboard) as well as special-purpose keyboards (such as the also-ubiquitous telephone-keypad-styled keyboard). While some of these keyboards are so-called virtual keyboards that comprise the presentation of interactive keycaps on, for example, a touch-sensitive display, physical keyboards comprised of one or more moving mechanical elements remain in demand (often as a preferred user-entry modality).

Many physical keyboards include backlighting. Backlighting serves to direct light to the backside of one or more of the keyboard's keycaps to thereby illuminate part or all of the keycap and/or informational content presented thereon. For example, alphanumeric characters displayed on the keycaps illuminated in this fashion can make it considerably easier for the user to locate desired keys when entering content.

While many backlighting techniques are well known in the art, unfortunately such known practices are not wholly satisfactory in all application settings. For example, backlighting across the keyboard may not be completely consistent for any of a variety of reasons. Such inconsistency, in turn, can produce unduly bright and/or unduly dim illuminated areas on the keyboard. Such inconsistencies, in turn, can render accurate use of the keyboard more problematic and/or can otherwise detract from the aesthetic quality of the keyboard and the corresponding electronic device.

DETAILED DESCRIPTION

Figure 1:
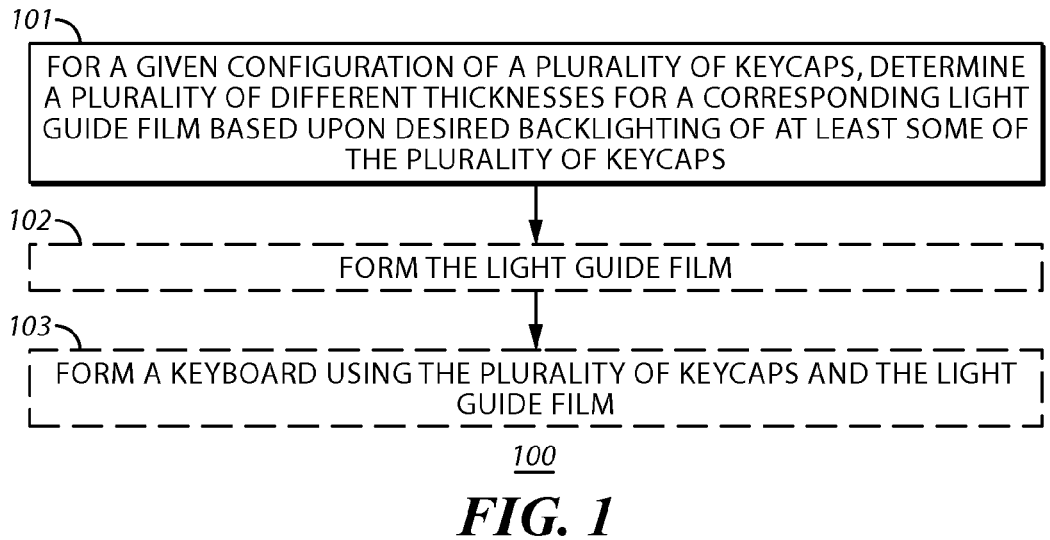
FIG. 1 is a flow diagram in accordance with the disclosure.

The following describes an apparatus and method pertaining to an apparatus (such as a keyboard) having a plurality of keycaps and a corresponding light guide film disposed on the underside of those keycaps. The light guide film has a periphery, and at least portions of that periphery are thicker than an interior portion of the light guide film. So configured, more light can be made available for backlighting purposes in the thicker portions than at the thinner portions. These teachings then include determining the various (different) thicknesses to employ for the light guide film based upon desired backlighting of one or more of the plurality of keycaps.

By one approach the light guide film comprises a soft light guide film. The backlighting source(s) itself can comprise, by one approach, one or more light sources (such as, for example, side-firing light-emitting diodes) that are disposed to direct light into the light guide film substantially parallel thereto.

These teachings are highly flexible in practice and will accommodate all manner and variety of keyboards and keycaps. In addition, while these teachings can serve to facilitate even backlighting across the range and expanse of a given keyboard, these teachings can also serve to intentionally reduce or increase backlighting at specific locations of the keyboard to serve a particular corresponding aesthetic or utilitarian purpose.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a process 100 that accords with the present teachings. At 101 this process 100 provides for determining, for a given configuration of a plurality of keycaps, a plurality of different thicknesses for a corresponding light guide film based upon desired backlighting of at least some of those keycaps. By one approach this determination can comprise, at least in part, determining at least one of a thicker peripheral portion and a thinner peripheral portion of the light guide film than at an interior portion thereof.

That done, at 102 this process 100 can then optionally provide for forming a light guide film in accordance with the foregoing determination and then, at 103, forming a keyboard using that plurality of keycaps and the resultant light guide film. By one approach, that forming activity can comprise, at least in part, co-molding thicker portions of the light guide film with less-thick portions of the light guide film.

So configured, and when using, for example, side-firing light sources, the thicker areas of the light guide film can convey a larger amount of light than the thinner areas. Accordingly, the backlighting provided by the thicker areas of the light guide film can be brighter than the thinner areas of the light guide film (all other things being equal).

The thickness determinations made at 101 will vary from one application setting to another. Various influencing factors can include, but are not limited to, the specifics of the light sources themselves (such as their intensity and color), the orientation of the light sources, the distance of the light sources from the light guide film, the number of light sources, the specific material (or materials) that comprise the light guide film, and the size and shape of the light guide film (to note but a few examples in these regards).

These thickness determinations can also take into account, if desired, the specifics of the keycaps themselves. As one illustrative example in these regards, one keycap may have a very different light-diffusing approach than another keycap and hence may need less, or more, backlighting in order to appear the same as the other keycap.

Accordingly, the contemplated thickness determinations at 101 are subject to a great number of application-setting specifics as well as possible subjective goals regarding aesthetics and other light-based design criteria. By one approach these determinations at 101 can be empirically determined through experimentation. By another approach, if desired, the various parameters of interest can be modeled as a computer program to permit virtual design and determination activity.

For the sake of illustration a specific example will now be provided in these regards. It will be understood that the specifics of this example are offered for the sake of illustration and are not intended to suggest any particular limitations in these regards.

Figure 2:
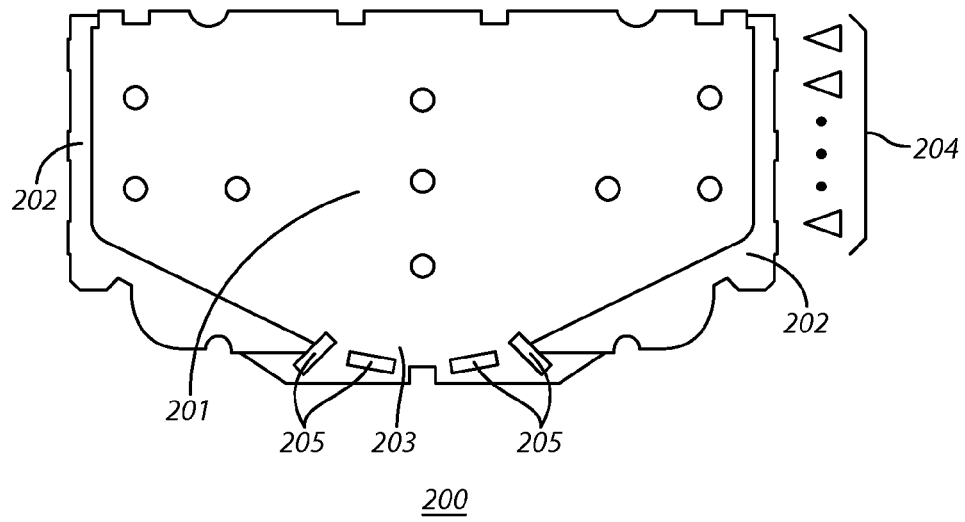
FIG. 2 is a top plan view in accordance with the disclosure.

FIG. 2 presents a view of a light guide film 200. This light guide film 200 has a particular form factor that compliments a corresponding keyboard (not yet shown) as will be well understood in the art. In this example the light guide film 200 comprises a soft light guide film 200 formed, for example, of silicon rubber, an optical-grade clear rubber, or a thermoplastic urethane.

If desired, the light guide film 200 can comprise more than one such material. For example, a thicker portion of the light guide film 200 can comprise a base layer of silicon rubber and an upper layer can be comprised of thermoplastic urethane. When using more than one such material the formation of the light guide film 200 can include, for example, co-molding the two materials/layers with one another. Generally speaking, co-molding techniques and methodologies using such materials comprises a well-understood area of endeavor. Accordingly, further elaboration in these regards will not be provided here for the sake of brevity.

In this example the interior portions 201 of the light guide film 200 have a substantially uniform thickness. Opposing side peripheral areas 202, however, are thicker than the aforementioned interior portions 201 as per the thickness determination described above. That said, in this illustrative example it will be noted that not all portions of the light guide film's 200 periphery are thicker than the interior thickness. For example, the front periphery 203 of the light guide film 200 has the same thickness as the aforementioned interior portion 201.

When completed, the keyboard assembly will include, in this example, a plurality of light sources 204 (such as, but not limited to, light-emitting diodes) disposed along at least a portion of the periphery of the light guide film 200. In many application settings it will serve well for these light sources 204 to be disposed and oriented to direct their light into the light guide film 200 substantially parallel thereto. The present teachings will accommodate various practices in these regards. For example, some or all of the light sources 204 may or may not have their corresponding light beams oriented substantially parallel to one another as well if desired.

These teachings will also accommodate, in lieu of the foregoing or in combination therewith, including one or more light sources within the interior of the light guide film 200 if desired. For example, by one approach one or more light sources can each be disposed within a corresponding rectangularly-shaped opening 205 provided therefor in the light guide film 200. By one approach, such an interior-disposed light source can also be configured to direct its light substantially parallel (or not) to the light guide film 200 in some desired direction.

Figure 3:
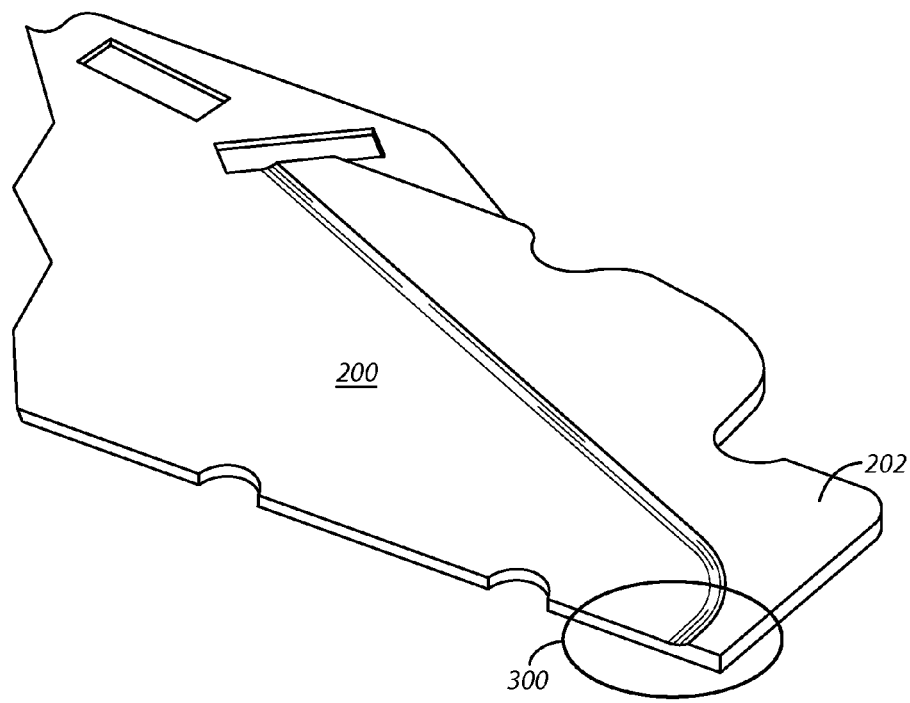
FIG. 3 is a perspective detail view in accordance with the disclosure.
Figure 4:
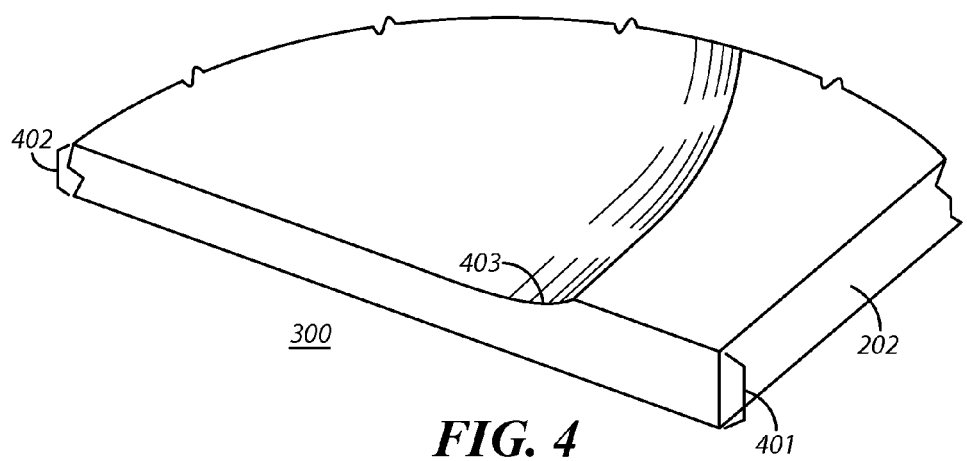
FIG. 4 is an enlarged perspective detail view in accordance with the disclosure.

FIGS. 3 and 4 provide further illustrative details regarding the differing thicknesses described above. Referring in particular to the detail area denoted by reference numeral 300, the thinner area is shown as having a first thickness as denoted by reference numeral 402 whereas the thicker area at the periphery 202 is shown as having a second thickness (denoted by reference numeral 401) that is larger than the first thickness 402.

By one approach, if desired, differences in thickness can comprise an abrupt step function. By another approach, and as illustrated, the thicker areas can meet the thinner areas via a thickness gradient 403. The specific shape and size of such a thickness gradient 403 can vary as desired.

Figure 5:
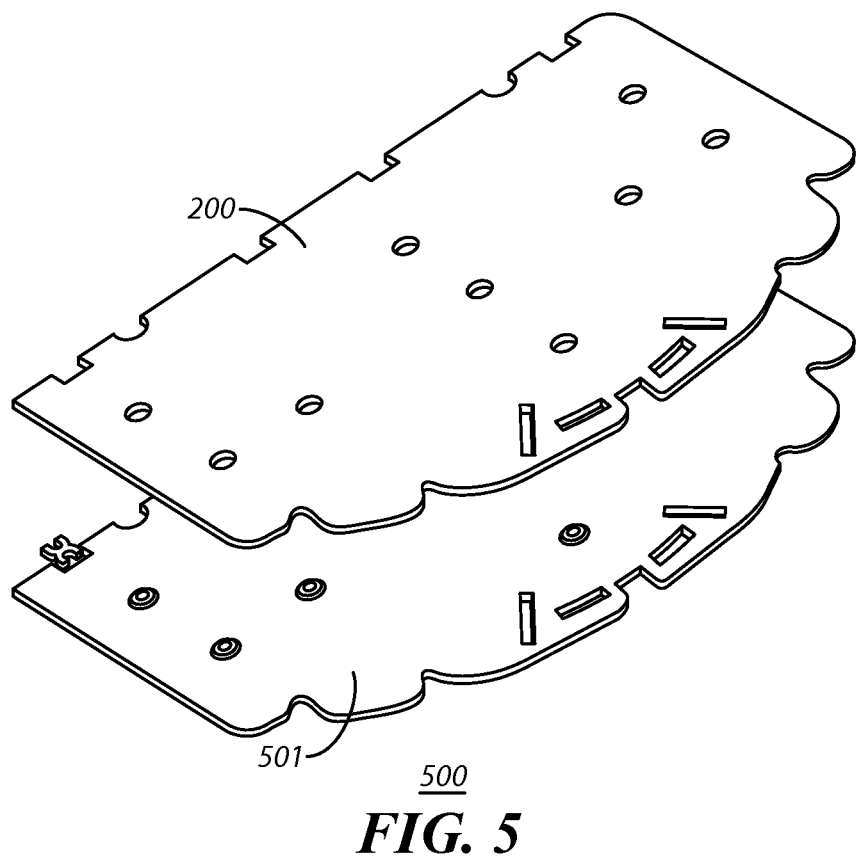
FIG. 5 is a perspective exploded view in accordance with the disclosure.

Referring now to FIG. 5 the aforementioned light guide film 200 is secured to a lower plate 501. This lower plate 501 can, for example, provide strength and rigidity to the resultant light guide film subassembly 500 and can also help to prevent light from escaping through the bottom side of the light guide film 200. Various approaches in these regards are known in the art. As the present teachings are not overly sensitive to any particular choices in these regards, further details are not provided regarding such a lower plate 501 or subassembly 500.

Figure 6:
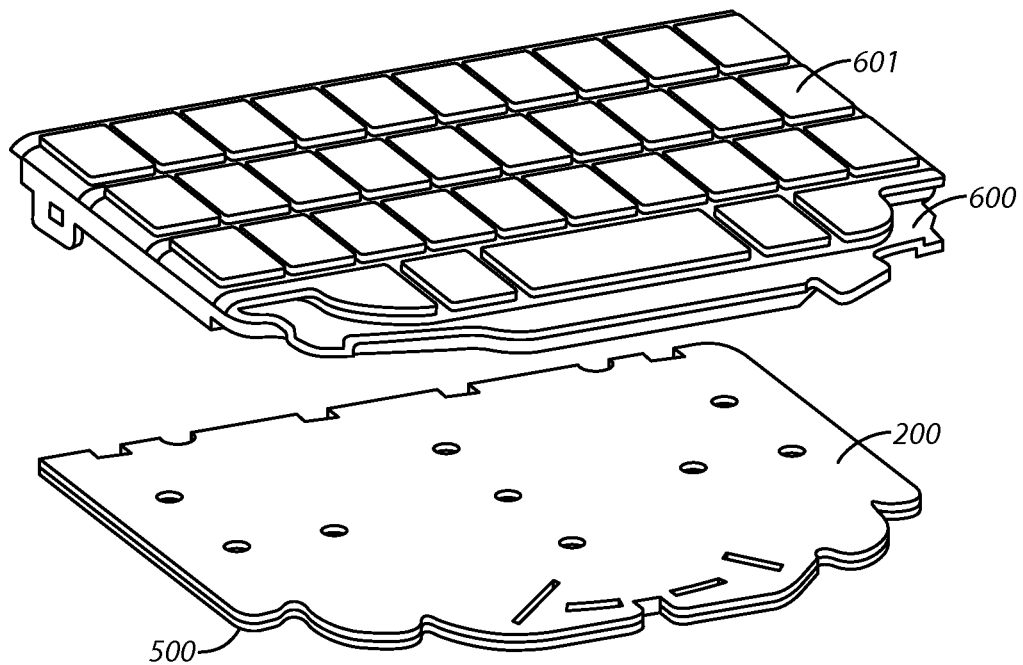
FIG. 6 is a perspective exploded view in accordance with the disclosure.

Referring now to FIG. 6, the aforementioned light guide film subassembly 500 can be secured to the underside of a corresponding keypad subassembly 600 that features a plurality of keycaps 601 on its upper surface. In particular, the light guide film subassembly 500 is joined to the keypad subassembly 600 such that the upper surface of the light guide film 200 underlies the keycaps 601. So configured, the light guide film 200 can provide backlighting to the keycaps 601 in accordance with well-understood practice.

Here, however, the backlighting intensity provided by the light guide film 200 will vary due to the varying thicknesses of the light guide film 200 described above. As a result, in this particular illustrative example, the thicker portions at the periphery of the light guide film 200 will provide brighter backlighting in this area than would have occurred if the light guide film 200 were of all the same thickness. It is presumed in this example that this increased level of backlighting serves a desired and intended purpose. For example, at least some of those thicker portions of the light guide film 200 can be disposed in registration with some (but not all) of the keycaps 601 to effect the resultant brighter backlighting effect with respect to those particular keycaps 601.

As mentioned above these teachings are highly flexible in practice. One may, for example, also include interior portions of the light guide film 200 that are thicker than other interior portions of the light guide film 200. In such a case these interior portions may be as thick as, for example, the peripheral portions. These teachings will also accommodate, however, having thicker interior portions that are nevertheless thinner than the periphery or, if desired, thicker than the periphery.

These teachings will also accommodate having some interior portions of the light guide film 200 relatively thinner than other interior portions. Such an approach can serve, for example, to resolve local areas of unduly bright backlighting that may be occurring for whatever reason.

Accordingly, it will be understood that these teachings generally provide for intentionally sculpting the relative thicknesses of a light guide film 200 to provide lesser or greater amounts of backlighting to thereby achieve a desired backlighting effect for the keycaps 601 of a given keyboard. By one approach, for example, this can serve to ensure uniform backlighting across all keycaps 601. These teachings will also support, however, purposefully creating relatively brighter and/or darker areas of backlighting to achieve specific corresponding aesthetic results.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
   a plurality of keycaps;
   a light guide film disposed on an underside of the plurality of keycaps, the light guide film having a periphery and wherein at least portions of the periphery are thicker than an interior portion of the light guide film and are disposed in full registration with at least one of the plurality of keycaps.

2. The apparatus of claim 1 wherein at least some of the thicker portions of the light guide film are disposed in registration with a plurality, but not all, of the plurality of keycaps.

3. The apparatus of claim 1 wherein the light guide film comprises a soft light guide film.

4. The apparatus of claim 3 wherein the light guide film comprises, at least in part at least one of:
   silicon rubber;
   an optical grade clear rubber; and
   thermoplastic urethane.

5. The apparatus of claim 1 further comprising:
   a plurality of light sources disposed along at least a portion of the periphery of the light guide film.

6. The apparatus of claim 5 wherein at least some of the plurality of light sources are disposed to direct light into the light guide film substantially parallel thereto.

7. The apparatus of claim 1 wherein at least one portion of the periphery is thinner than an interior portion of the light guide film.

8. A method comprising:
   for a given configuration of a plurality of keycaps, determining a plurality of different thicknesses for a corresponding light guide film by, at least in part, determining a thicker peripheral portion of the light guide film than an interior portion thereof based upon desired backlighting of at least some of the plurality of keycaps wherein at least a portion of the thicker peripheral portion is disposed in full registration with at least one of the plurality of keycap.

9. The method of claim 8 wherein the light guide film comprises a soft light guide film.

10. The method of claim 8 further comprising:
    forming the light guide film;
    forming a keyboard using the plurality of keycaps and the light guide film.

11. The method of claim 10 wherein forming the light guide film comprises, at least in part, co-molding thicker portions of the light guide film with less-thick portions of the light guide film.

12. The method of claim 10 wherein forming the keyboard further comprises disposing side-fired light sources along a periphery of the light guide film.

13. The method of claim 12 wherein the side-fire light sources comprises light-emitting diodes.

* * * * *